Figure 35:
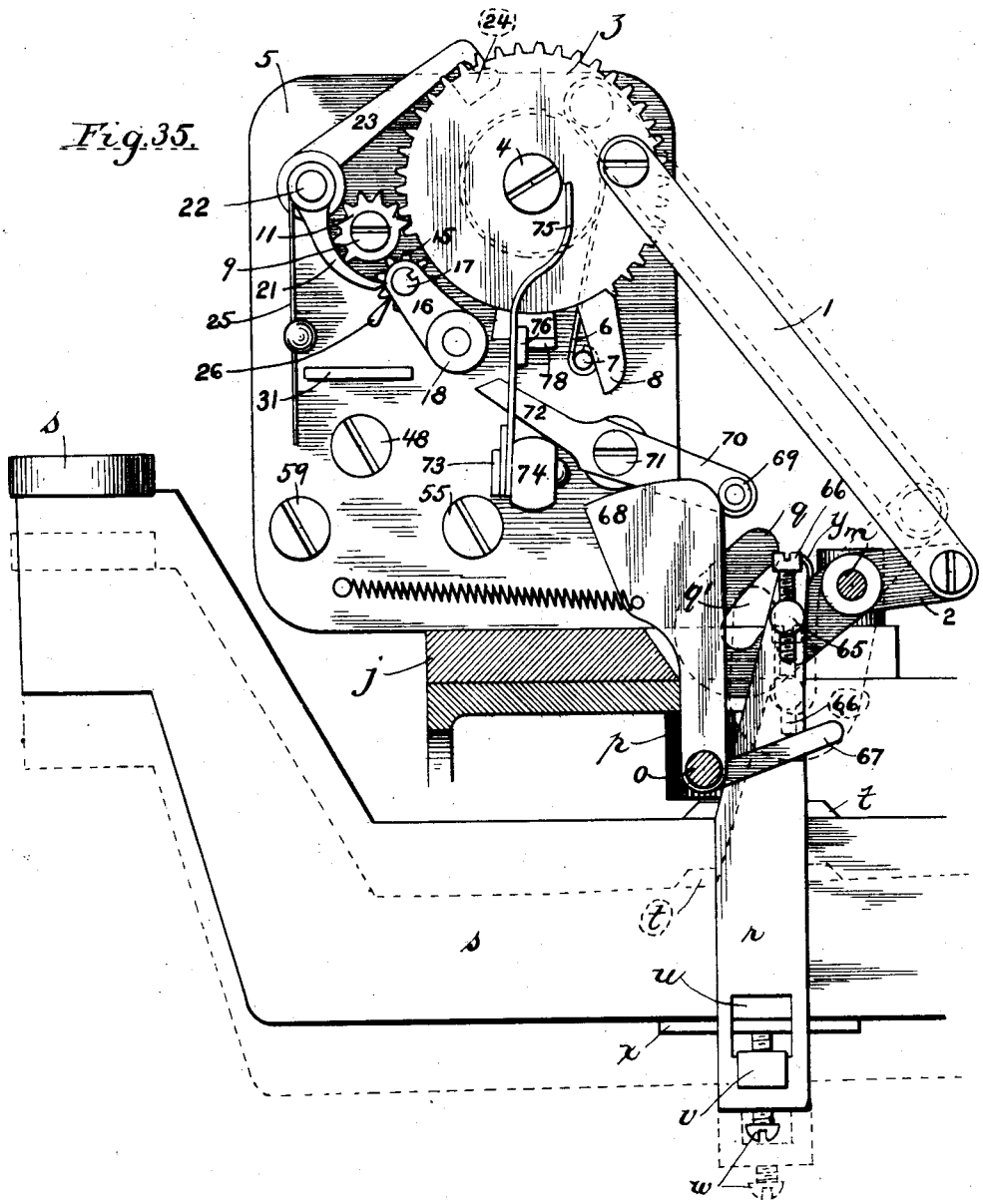

No. 712,518. Patented Nov. 4, 1902.
H. E. GOLDBERG.
CALCULATING MACHINE.
(Application filed Sept. 26, 1901.)
(No Model.) 9 Sheets—Sheet 1.
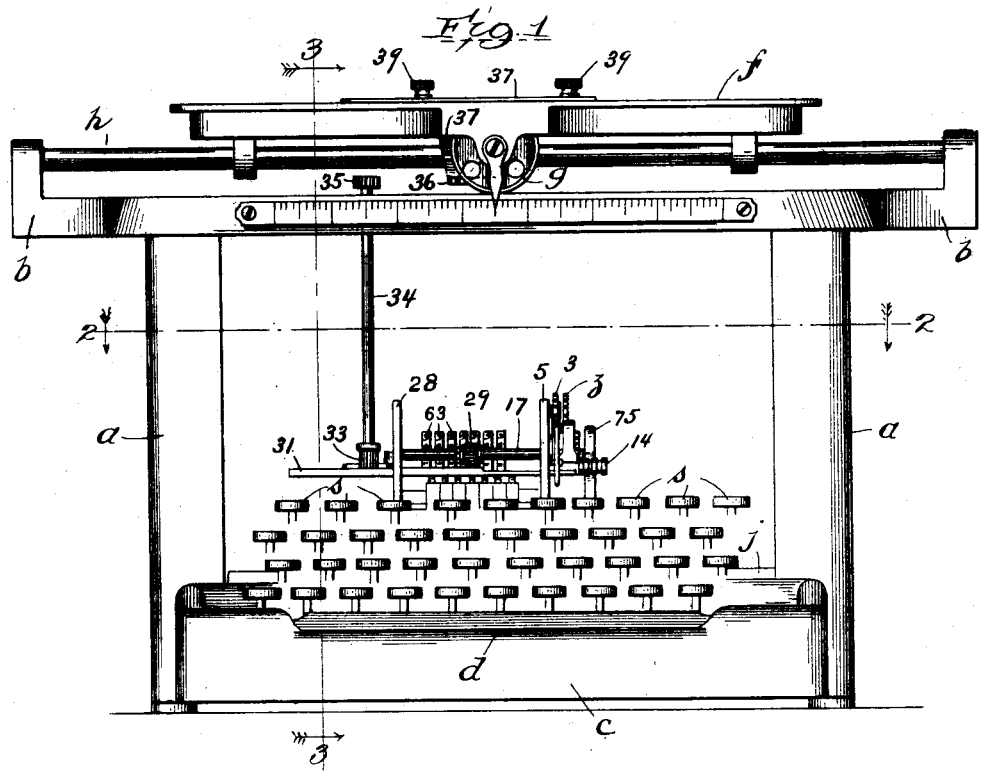
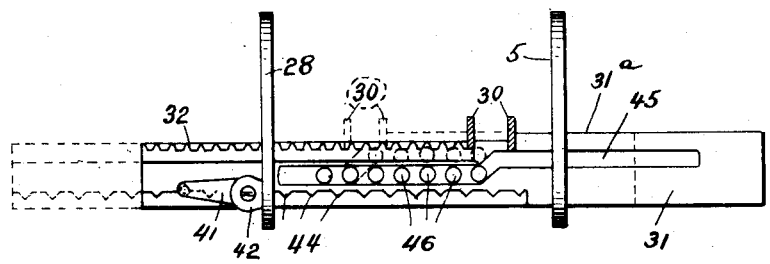
Witnesses:
Inventor
Hyman E. Goldberg;
By Jesse & H. M. Cox
Atty's.

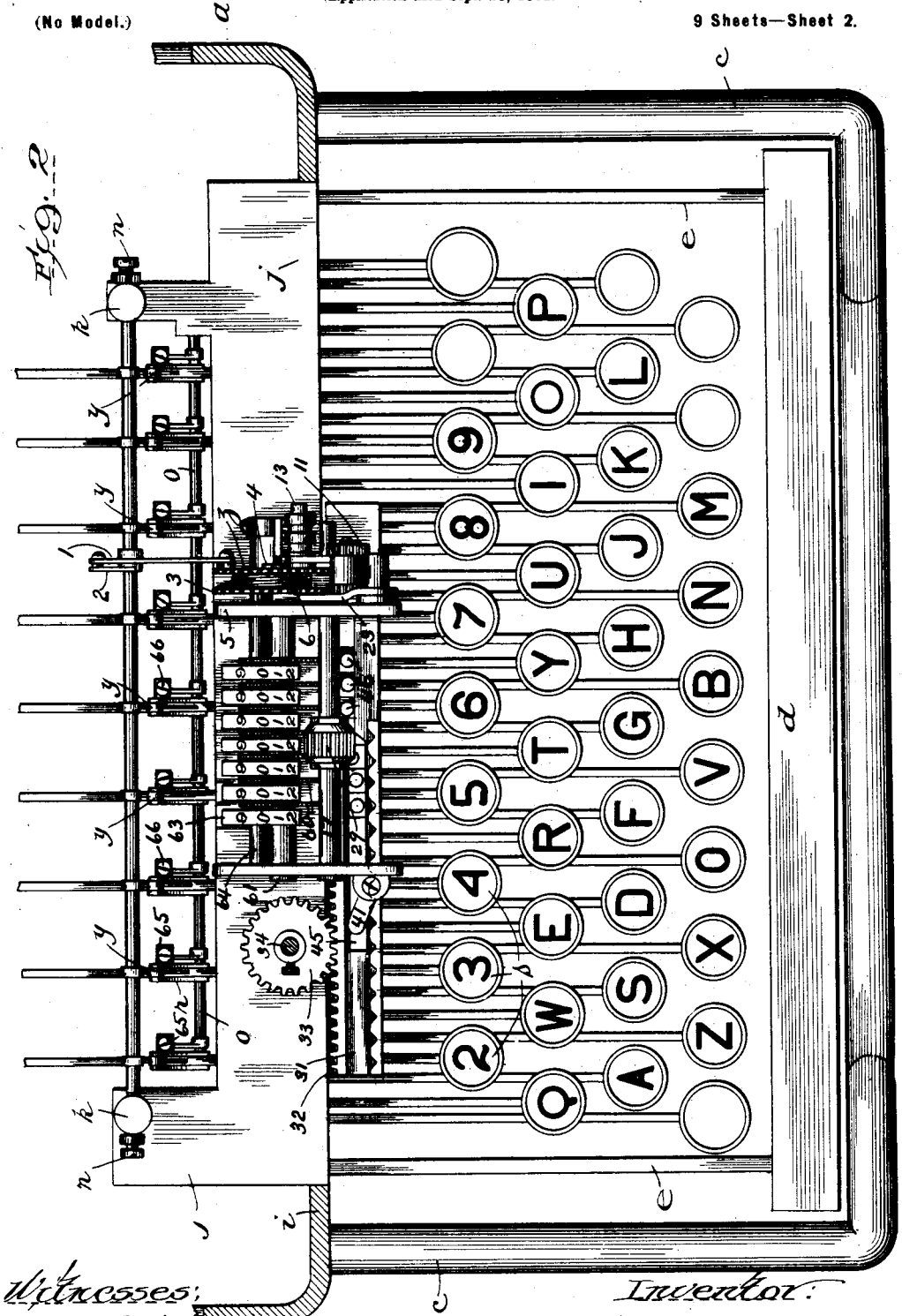

No. 712,518. Patented Nov. 4, 1902.
H. E. GOLDBERG.
CALCULATING MACHINE.
(Application filed Sept. 26, 1901.)
(No Model.) 9 Sheets—Sheet 3.
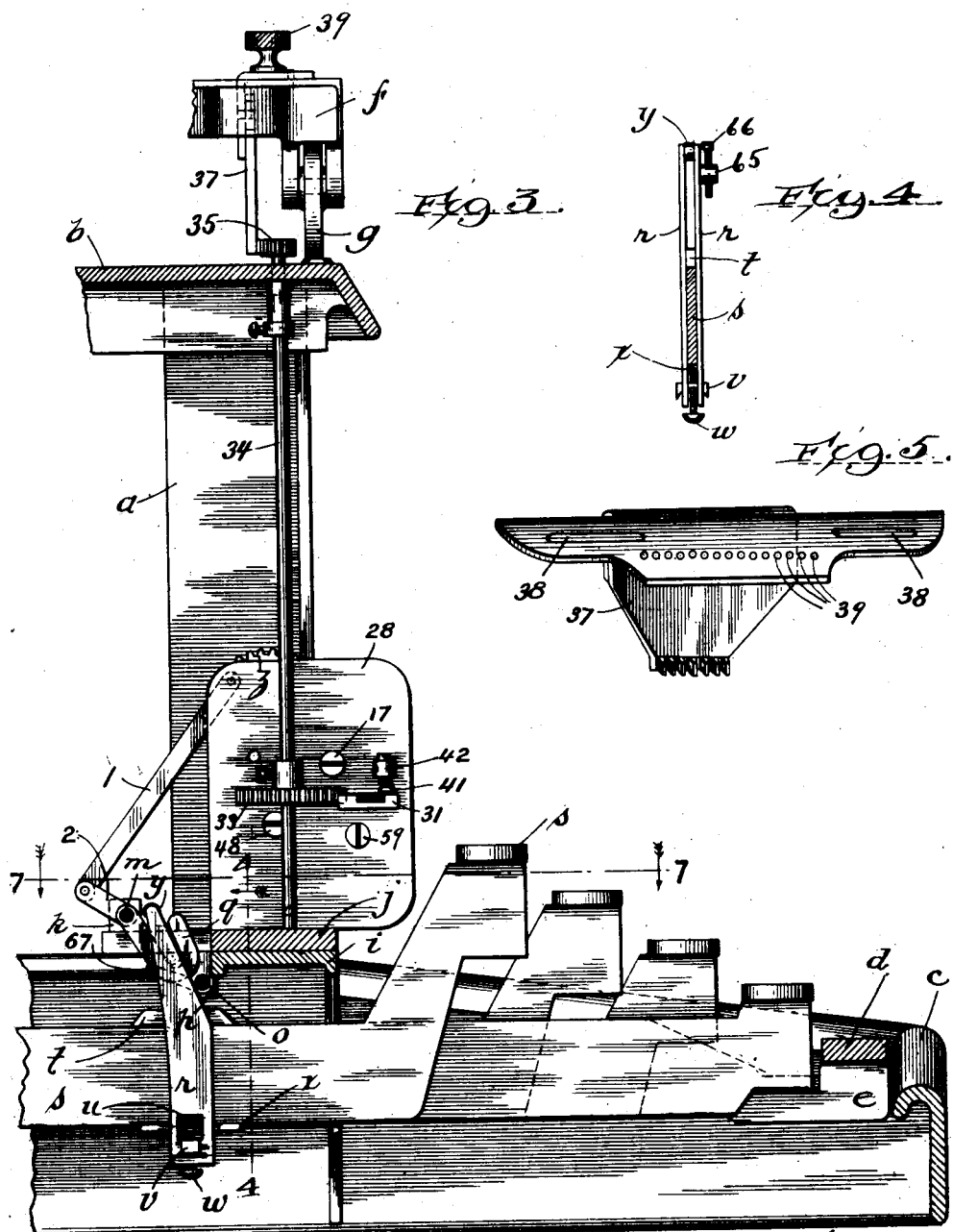
Witnesses:
Harry B. C. White.
Arthur M. Cox
Inventor:
Hyman E. Li. Goldberg.
By Jesse & H. M. Cox
Attys.

No. 712,518. Patented Nov. 4, 1902.
H. E. GOLDBERG.
CALCULATING MACHINE.
(Application filed Sept. 26, 1901.)
(No Model.) 9 Sheets—Sheet 4.
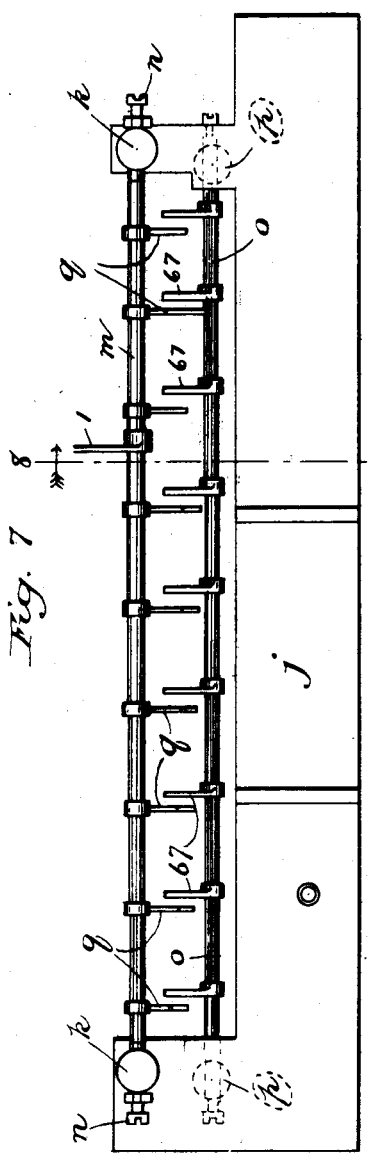
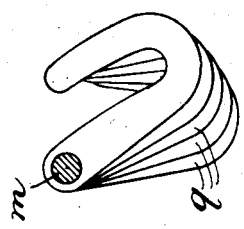
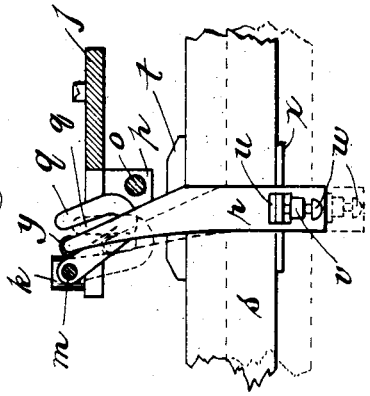
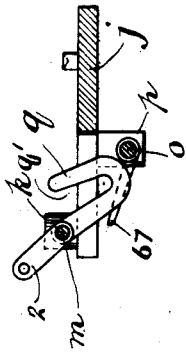
Witnesses:
Adolph Pike
Arthur M. Cox
Inventor
Hyman Eli Goldberg
By Jesse & H. M. Cox
Attys No. 712,518. Patented Nov. 4, 1902.
H. E. GOLDBERG.
CALCULATING MACHINE.
(Application filed Sept. 26, 1901.)
(No Model.) 9 Sheets—Sheet 5.
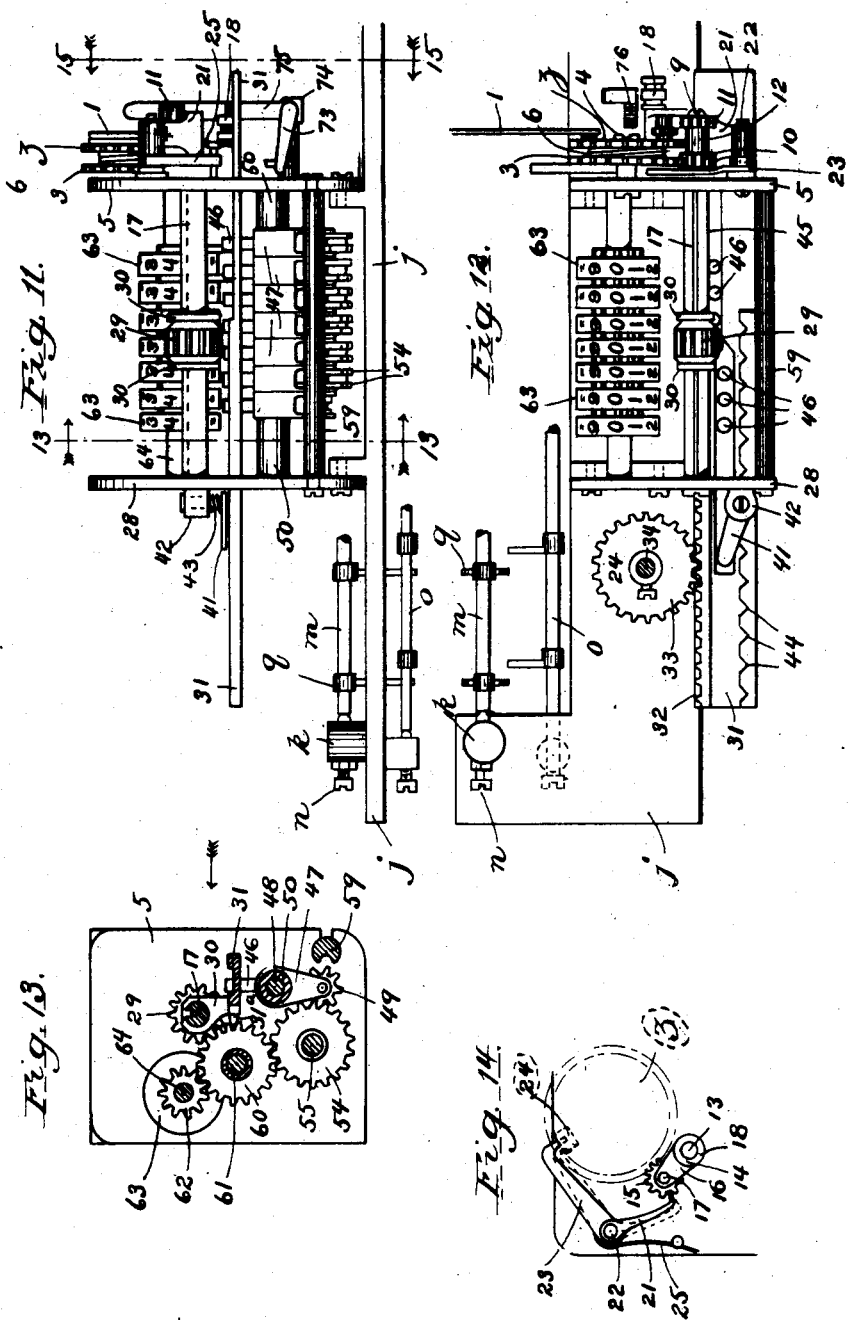

No. 712,518. Patented Nov. 4, 1902.
H. E. GOLDBERG.
CALCULATING MACHINE.
(Application filed Sept. 26, 1901.)
(No Model.) 9 Sheets—Sheet 6.
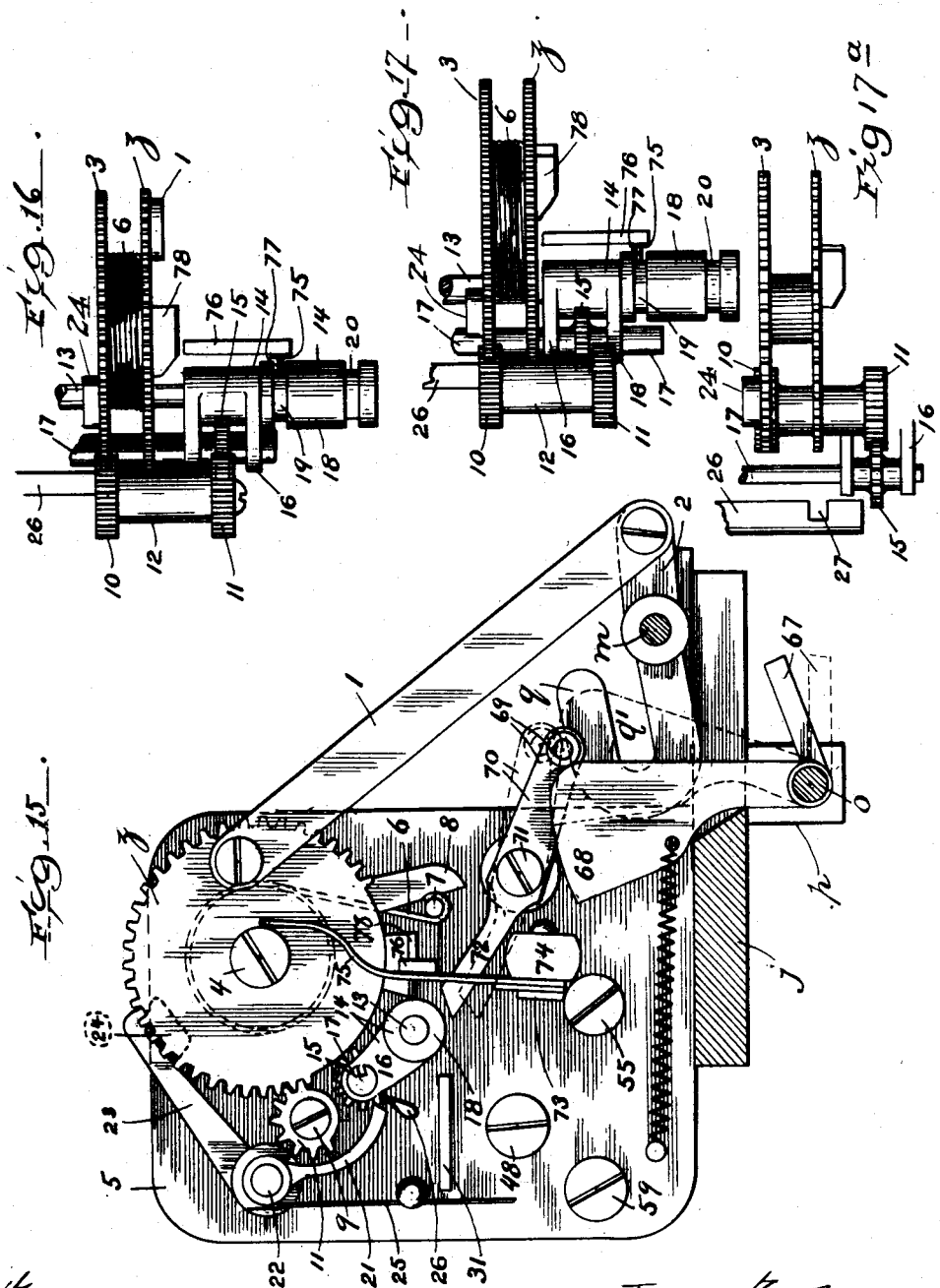

No. 712,518. Patented Nov. 4, 1902.
H. E. GOLDBERG.
CALCULATING MACHINE.
(Application filed Sept. 26, 1901.)
(No Model.) 9 Sheets—Sheet 7.
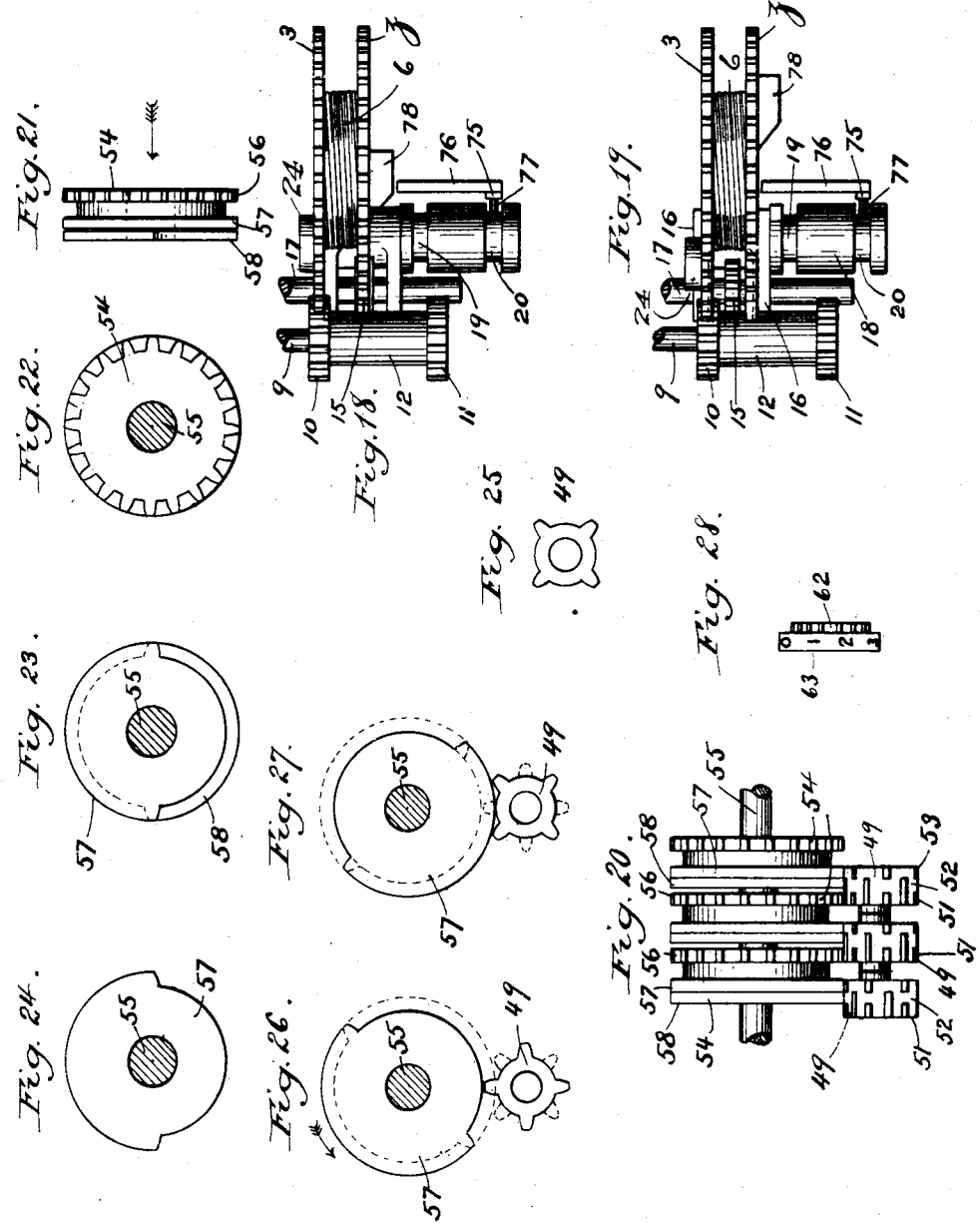

No. 712,518. Patented Nov. 4, 1902.
H. E. GOLDBERG.
CALCULATING MACHINE.
(Application filed Sept. 26, 1901.)
(No Model.) 9 Sheets—Sheet 8.
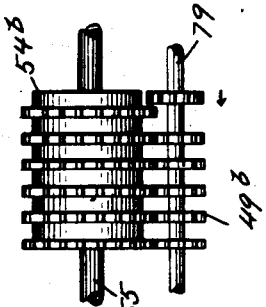
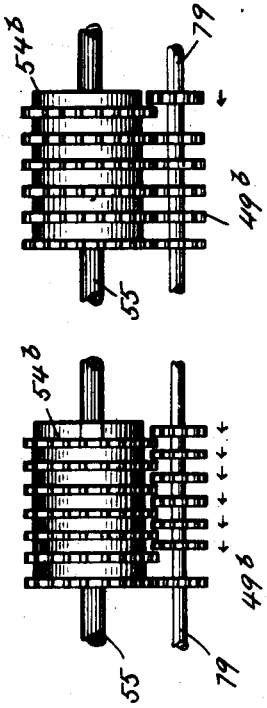
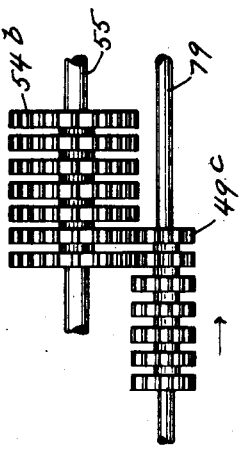
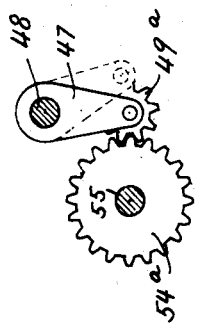
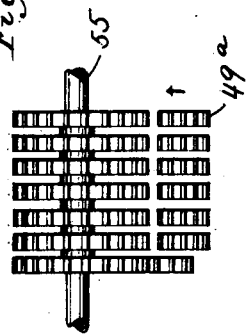
Witnesses
Adolph Pike
Arthur M. Cox
Inventor
Hyman Eli Goldberg
By Jesse & H. M. Cox
Attys.

No. 712,518. Patented Nov. 4, 1902.
H. E. GOLDBERG.
CALCULATING MACHINE.
(Application filed Sept. 26, 1901.)
(No Model.) 9 Sheets—Sheet 9.

Witnesses:
Arthur M. Cox
Adolph Pike

Inventor
Hyman Eli Goldberg,
By Jesse & H. M. Cox
Atty's

UNITED STATES PATENT OFFICE.

HYMAN ELI GOLDBERG, OF CHICAGO, ILLINOIS.

CALCULATING-MACHINE.

SPECIFICATION forming part of Letters Patent No. 712,518, dated November 4, 1902.

Application filed September 26, 1901. Serial No. 76,680. (No model.)

*To all whom it may concern:*

Be it known that I, HYMAN ELI GOLDBERG, of the city of Chicago, county of Cook, and State of Illinois, have invented a new and useful Improvement in Calculating-Machines, of which the following is a specification.

My invention relates to calculating-machines adapted for both adding and subtracting; and the objects of my invention are, first, to construct a machine which shall be positive acting, avoiding the use of springs, ratchets, and other elements of uncertainty for preventing overthrow of the figure-wheels; second, to provide a machine which shall be compact and consist of comparatively few parts of simple construction.

In order to illustrate the applicability of my invention to type-writing machines of known pattern, I have shown my calculating-machine embodied in and attached to a type-writer; but my invention may with equal advantage exist as a complete and independent machine, and, indeed, by disregarding the letter-keys and other parts superfluous to a calculating-machine the entire mechanism here shown becomes merely an adding and subtracting machine.

I attain these objects by the mechanism illustrated in the accompanying drawings, in which—

Figure 1 is a front view of the machine attached to and operated by a type-writer. Fig. 2 is a plan view of the same, taken on the line 2 2, Fig. 1, and drawn to an increased scale. Fig. 3 is a vertical sectional view of the calculating-machine and type-writer looking in the direction of the arrows on the line 3 3, Fig. 1. Fig. 4 is a sectional view of the key attachment looking in the direction of the arrows on the line 4 4, Fig. 3. Fig. 5 is a perspective view of the rack attached to the type-writer carriage for operating the traveling gear. Fig. 6 is a top view of the traveling gear above mentioned. Fig. 7 is a top view of the base-plate wherein are mounted the cam-axle and releasing-axle. Fig. 8 is a sectional view looking in the direction of the arrows on the line 8 8, Fig. 7, showing the axles shown in said Fig. 7. Fig. 9 is a view of the cam-axle and type-writer key, illustrating the action of the cams. Fig. 10 is a side view of a few of the cams, illustrating their arrangement on the cam-axle. Fig. 11 is a front view of the gear-frame of the calculating-machine, together with a portion of the base-plate thereof. Fig. 12 is a plan view of the parts shown in Fig. 11. Fig. 13 is a sectional view of the gear-frame, taken on the line 13 13, Fig. 11. Fig. 14 is a fragmentary view showing the locking device acting upon the setting-axle. Fig. 15 is a side view of the gear-frame, drawn to an enlarged scale and looking in the direction of the arrows, Fig. 11. Figs. 16 and 17 are top views of the reversing mechanism set for the operation of adding, Fig. 16 showing the position of the parts on the forward or setting-up stroke and Fig. 17 showing the parts on the return stroke. Fig. 17$^a$ is a diagrammatic view of the reversing-gear, the positions of the parts being slightly modified to better illustrate the operation of the fixed locking-bar. Figs. 18 and 19 are top views of the parts shown in Figs. 16 and 17 and illustrate the operation when the mechanism is to subtract. Fig. 18 shows the position of the parts for the active subtracting stroke and Fig. 19 for return stroke. Fig. 20 is a front view of the tens-carrying mechanism. Fig. 21 is a front view of one of the carrying-wheels of said tens-carrying mechanism. Fig. 22 is a face view of said carrying-wheel looking in the direction of the arrow, Fig. 21. Fig. 23 is a face view of said carrying-wheel, showing the mutual relationship of the disks thereof. Fig. 24 is a face view of one of the said disks of the carrying-wheels. Fig. 25 is a face view of one portion or section of one of the mutilated tens-carrying pinions. Figs. 26 and 27 are diagrammatic views and illustrate the action of the tens-carrying mechanism. Fig. 28 is a front view of one of the figure-wheels, showing the toothed gear thereon. Figs. 29 and 30 are diagrammatic views showing the manner of swinging the mutilated tens-carrying pinions radially into and out of mesh with the carrying-wheels. Figs. 31 and 32 are diagrammatic views showing an alternative method of driving the carrying-wheels—namely, by shifting the tens-carrying pinions laterally so as to mesh therewith one after the other, *seriatim.* Figs. 33 and 34 are also diagrammatic views showing another alternate method of driving the carrying-wheels—namely, by shifting the carrying-pinions as a single gang into mesh with the carrying-wheels. Fig. 35 is an assembly view looking in the direction of the arrows on the line 15 15, Fig. 11, illustrating the operation of the machine, particularly the fact that the cam is completely rotated in its setting-up action before the set-screw on the key-rider comes into contact with the arm for shifting the reversing mechanism.

Similar reference characters indicate similar parts throughout the several views.

In the present instance my calculating-machine is shown attached to a type-writer, known commercially as the "No. 2 Remington," $a$ $a$ representing the standards of the main frame of the type-writer, $b$ the top cross-frame thereof, and $c$ $c$ the front extension or key-frame thereof.

$d$ is the spacing-bar, supported on the spacing-bar arms $e$ $e$, for permitting the carriage $f$ to escape step by step toward the left. Said carriage $f$ is supported in front by the roller $g$, traveling upon the top cross-frame $b$, while the rod $h$ forms the support for the rear portion of said carriage.

The type-writer frame has a cross-piece $i$ extending between the standards $a$ $a$, and upon said cross-piece is secured the base-plate $j$ of the caculating-machine. Said base-plate is provided with the posts $k$ $k$, which form the mountings for the cam-axle $m$. Said axle is conically pointed at its extremities, so as to fit into the correspondingly-recessed set-screws $n$ $n$ in said posts $k$. In a similar manner the releasing-axle $o$ is mounted in the posts $p$ $p$ upon the under side of said base-plate $j$.

The cams $q$ $q$ consist of plates brazed or otherwise secured to the cam-axle $m$ and having slots $q'$ therein which may, if desired, be open at one end, as shown. Each of said slots is preferably of uniform width throughout its operative length and receives a roller $y$, mounted in the key-riders, as hereinafter described. It is desirable that the slots $q'$ be so curved as to be tangent to the path of the rollers $y$ at the final point in the downward travel thereof. By this construction the cams become temporarily locked in position and overthrow or accidental rotation of the cam-axle is prevented. The cams are so constructed that the slots $q'$ extend beyond the extreme points in the path of the rollers $y$, and therefore do not limit the travel of the said rollers and connected parts, thus avoiding any sudden shock or jar and preserving the resiliency of key action. As illustrated in Fig. 10, said cams are secured to the cam-axle $m$ at different angles in order that said axle may be rotated definite amounts when acted upon by the respective keys, the quantity of rotation depending upon the face value of the key struck. Said cams are operated by key-riders which consist of plates $r$ $r$, removably secured to the figure-keys $s$ $s$ of the type-writer in the manner best shown in Fig. 4. The rider-block $t$ is adapted to rest upon the shank of the key $s$ and is brazed or otherwise secured to the plates $r$, so as to hold the same firmly together. The lower extremities of said plates $r$ project below the key-shank, where they are provided with apertures $u$ for receiving the wedge-block $v$. Said wedge-blocks, which are of a length somewhat greater than the distance between the outer faces of the rider-plates $r$, have double internal bevels so arranged as to engage said rider-plates at the apertures $u$ therein. The set-screws $w$, mounted in said wedge-blocks, are designed to bear against the sole-plates $x$ at the lower edge of the keys $s$ in such a manner that when said screws are tightened the key-shank will be screwed in a vertical direction between the rider-block $t$ and sole-plate $x$. At the same time the wedging action of the block $v$ will cause the rider-plates $r$ to be forced laterally toward said key-shank. By this construction the simple tightening of the screw $w$ will cause the key-shank to be firmly engaged upon all four surfaces. When it is desired to remove the rider from the key, the set-screws are withdrawn from the wedge-block $v$, when the parts may be readily disassembled. At their upper extremities said rider-plates carry the rollers $y$, which are adapted to act within the slots $q'$ of the cams $q$ and rotate the axle $m$ in the manner above mentioned. The rotation of said axle is imparted to the driving gear-wheel $z$ by means of the link 1, which is pivotally connected at one extremity to said wheel and at the other extremity to the arm 2, said arm being brazed or otherwise secured to said axle $m$. The second driving-wheel 3 is secured to the said wheel $z$, so as to rotate therewith upon the arbor 4, projecting from the upright plate 5 of the machine-frame. Said wheels $z$ and 3, operating as a single piece, tend to return to and remain in the starting position by the influence of the spring 6, which encircles the hub common to both of said wheels and is attached at one end to said hub and at the other end to a stationary part of the machine—for example, the pin 7. (Shown in Fig. 15.) Through the agency of the connecting-link 1 the returning of the wheels $z$ and 3 to the initial position also returns the cam-axle $m$ and cams thereon to their initial position. The return movement of the said driving gear-wheels and cam-axle is limited by said pin 7, which forms a stop for the arm 8, carried by the wheel $z$.

Mounted so as to rotate freely upon the arbor 9, projecting from the frame-plate 5, are the reversing-gear wheels 10 and 11, which are preferably integral with the hub or barrel 12. The inner wheel 10 is at all times in mesh with the drive-wheel 3, while the outer wheel 11 is at a point out beyond the drive-wheel $z$. The arbor 13, also projecting from the plate 5, is parallel to the arbors 4 and 9 and carries the frame 14 for the master-pinion 15. Said frame is free to move lengthwise upon said arbor and is provided with the parallel arms 16 16, which loosely receive the setting-axle 17. Said master-pinion is splined upon said axle 17, so that said pinion may be shifted lengthwise of said shaft; but the rotation of said pinion will be at all times imparted to said axle. The said frame 14 has a projecting hub 18, provided with the grooves 19 and 20, whereby said frame may be shifted upon the arbor 13, said groove 19 lying nearer the frame-plate 5. An automatic mechanism, which will be hereinafter described, is provided for shifting the said hub and master-pinion frame upon the setting-axle 17; but it is sufficient for the present to say that the said frame may be caused to assume four distinct positions, the master-pinion 15 being, first, in mesh with the gear-wheel 11, as shown in Fig. 16; second, out of mesh with said wheel 11 and located between said wheel 11 and the wheel $z$, as shown in Fig. 17; third, in mesh with said wheel $z$, as in Fig. 18, and, fourth, out of mesh with said wheel $z$, as shown in Fig. 19.

The above-mentioned mechanism for shifting the frame 14 is operated by the driving-wheel $z$; but it is necessary that said pinion shall not interfere with the wheels $z$ or 11 while said pinion is being shifted back again into its original position. In order that the shifting motion of the pinion may be completed before the latter begins to rotate upon the new stroke, certain of the teeth of said wheels $z$ and 11 are cut away. It will be apparent by referring to Fig. 15 that in the present instance said wheels $z$ and 11 will rotate approximately three teeth before engaging said master-pinion, this amount of rotation being sufficient for the completion of the shifting action of said wheel $z$. In other words, it will be understood that when the driving-wheel $z$ is about to start upon a new stroke the pinion 15 is in line to mesh therewith, and such meshing does take place when said driving-wheel has been rotated far enough for its teeth to engage the teeth of said pinion. When the forward motion of the driving-wheel $z$ has been completed, the pinion is shifted to the side out of mesh with said driving gear-wheel. Said pinion remains at the side of said driving-wheel out of mesh therewith until said driving-wheel has nearly completed its return stroke; but during the final part of the return stroke of said driving-wheel $z$ said pinion is shifted back again into line with said driving-wheel, and it is to prevent interference during this last part of the return stroke of said driving-wheel that the first few teeth of said driving-wheel are cut away. As it is necessary that said pinion 15 shall not rotate previous to its engagement with the said wheels $z$ and 11, a safety locking device is provided, which consists of an arm 21, pivoted on the arbor 22, projecting from the frame-plate 5. Said arm is adapted to swing into and out of engagement with said pinion 15 and is operated by means of the arm 23. Said arm 23 is in turn actuated by the lug 24, formed upon the wheel 3, as shown in Fig. 14, and the parts are so timed that said detaining-arm 21 will release the pinion 15 just prior to the engagement of said pinion with the respective gear-wheels. A spring 25 tends to keep the arm 23 in its proper position. Another safety device consists of the fixed locking-bar 26. (Best shown in Figs. 15, 16, and 17 and diagrammatically in Fig. 17$^a$.) Said bar is secured to the frame-plate 5 and engages the pinion 15 when the latter is out of engagement with the locking-arm 21, wheel 11, or wheel $z$. The notch 27 in said fixed bar permits said pinion 15 to rotate when the latter is in mesh with the driving-wheel $z$.

The frame-plate 28, which in the present instance is similar to the frame-plate 5, is secured to the base-plate $j$ and forms a support for parts of the mechanism, as will hereinafter appear. The setting-axle 17, which carries the master-pinion 15, extends to and has a bearing in the said plate 28, and the setting-pinion 29 is splined to said axle, so as to rotate therewith and be shiftable thereon. The position of the pinion 29 lengthwise upon the axle 17 is controlled by the arms 30 30, which form a part of the slide bar or plate 31. Said slide-bar is supported in the plates 5 and 28 so as to be free to move longitudinally and is provided with a toothed rack 32, which is engaged by the gear-wheel 33, whereby said slide-bar is shifted. The gear 33 is fastened to the spindle 34, which has a bearing on the base-plate $j$, and also in the top cross-frame $b$. At the upper extremity of said spindle is the pinion 35, which is so located as to be engaged by the toothed rack 36, formed upon the depending portion of the carriage-plate 37. The parts are so related that when the carriage $f$, carrying said plate 37, has brought the rack 36 into mesh with the pinion 35 the step-by-step escaping motion of said carriage will impart a corresponding motion to the slide-bar 31. By referring to Fig. 1 it will be seen that the rack 36 is not in engagement with the pinion 35 at all positions of the carriage $f$, but that such engagement does not commence until the said carriage has reached a position near the left of the main frame of the machine. This means that the calculating mechanism is inoperative until the carriage has brought the recording sheet of paper to such a position that the type will be printed near the right edge of the paper. The purpose of this arrangement will be obvious when it is borne in mind that it is the common practice in billing, invoicing, and tabulating to write the description of the items at the left portion of the sheet and to write the numbers to be totalized in a column at the right portion of the sheet. It is evident, therefore, that in a machine which prints both letter and figure characters it is necessary that the calculating mechanism act only during the printing of the numbers to be totalized. This provision whereby the calculating mechanism acts during a portion only of the travel of the carriage is not required in a machine which prints merely the numbers to be totalized.

In order that the position of the column of figures upon the recording-sheet may be varied, the plate 37 is adjustably attached to the carriage $f$, said plate having elongated slots 38 for receiving the set-screws 39. The apertures 40 in said plate are adapted to receive a pin (not shown) upon the carriage for the purpose of accurately determining the proper locations for said plate.

It is desirable that the slide-bar 31 be accurately placed during the rotation of the setting-pinion 39, and to attain this an adjusting device is provided which consists of a detaining-arm 41, mounted in the lug 42 on the frame-plate 28, said arm being acted upon by the spring 43 in such a manner that a portion of said arm tends to enter the notches 44 in the slide-bar 31. The slides of said notches are beveled in order that said arm may easily force its way into and be forced out of engagement with said notches when the slide-bar is moved by the toothed gearing.

The sliding locking-bar $31^a$ extends along the edge of the slide-bar 31 in such a manner as to engage and lock the idler-wheels 60, hereinafter referred to. This locking-bar is formed on the slide-bar to the right of the pinion 29, so that it is only the idlers to the right of said pinion which are locked by said bar. As said slide-bar progresses toward the right said idlers will be released one after the other just prior to their coming into gear with said pinion 29. This prevents the rotation of the figure-wheels to the right of the one in geared connection with said pinion.

The slide-bar 31 has a slot 45 for receiving the pins 46 46, which are formed at the upper extremities of the rocking frames 47 47. Said slot consists of two straight portions which extend lengthwise of the bar, but which are offset relatively to each other in such a manner as to form a cam for moving said pins 46 in a direction transverse to the length of the bar and for locking said pins at each extremity of their throw. Said frames 47 are pivoted upon the fixed bar 48 and have the ten carrying-pinions 49 revolubly mounted near their lower extremities. Said frames are maintained in their proper positions on the bar 48 by the spacing-collars 50. (Best shown in Figs. 11 and 13.) Each of said pinions comprises three sections arranged side by side across the width of the pinion—that is to say, in the direction of the axis thereof. Referring to Fig. 20, the section 51 at the left is a complete toothed gear having an even number of teeth, while sections 52 and 53 are mutilated by the removal of every alternate tooth. By preference a gear is selected having eight teeth, thereby leaving four teeth upon each of the sections 52 and 53. Said mutilated sections are so relatively placed that the remaining teeth alternate one with another—that is to say, are staggered—so that a tooth on one section is adjacent to a space upon the other.

The carrying-wheels 54 are mounted so as to rotate independently upon the fixed bar 55 and are also composed of three sections, the section 56 upon the right being a complete toothed gear adapted to mesh with the section 51 of the pinions 49. This section 56 has some multiple of twenty teeth, the present wheel being provided with twenty. Sections 57 and 58 of the wheels 54 are disks each having circular peripheries, which are divided in the present machine into two approximately equal portions. One portion of the periphery of each wheel corresponds to the root-circle of a gear and the second portion to the point-circle thereof. The point-circle portion, however—that is, the portion of greatest diameter—exceeds a semicircumference by the width of a single tooth, so that when said sections 57 and 58 are adjacent the point-circle portions overlap each other an area equal to two teeth, as clearly illustrated in Figs. 23, 24, 26, and 27 of the drawings. These overlapping portions may be regarded as carrying-teeth, and although the preferred number upon each carrying-wheel is two an even number consisting of four or more such teeth may be employed. The present machine shows two overlapping teeth to correspond to the section 56, which has two sets of ten teeth. In general the number of overlapping carrying-teeth must be the same as the number of sets of ten teeth on the section 56. The wheel-sections 57 and 58 engage with and intermittently drive and lock the pinions 49.

By reference to Figs. 26 and 27 it will be seen that pinions 49 are ordinarily locked by the carrying-wheels 54, except when the overlapping carrying-tooth reaches the pinion 49. At this time the carrying-wheel rotates the pinion 49 one tooth and immediately locks it again. Since there is an overlapping tooth for each set of ten teeth upon wheel 54, this results in turning pinion 49 one tooth for every tenth tooth of wheel 54. The intermittent rotating and meantime locking of the pinions 49 by the wheels 54 results from the fact that when a tooth upon the pinion-section 53 is in juxtaposition to the root-circle portion of the disk 57 the point-circle portion of the disk 58 lies between two teeth of the pinion-section 52, as shown in Figs. 26 and 27.

Referring to Fig. 20, it will be noted that the pinions 49 are so located as to engage two different wheels 54, the mutilated sections 52 and 53 of any given pinion engaging the disks 58 and 57 of one wheel 54 and the complete section 51 on said given pinion engaging the section 56 on the next higher wheel 54. Consequently whenever a wheel 54 turns the pinion 49 one tooth it also turns the next higher wheel 54 one tooth, thus carrying the tens. When the carrying-pinions 49 are swung out of mesh with the carrying-wheels 54 by the rocking frame 47, said pinions are locked by the fixed locking-bar 59. (Shown in Fig. 13.)

The idler-wheels 60, mounted so as to rotate independently on the fixed shaft 61, mesh with their respective carrying-wheels 54 and also with the gears 62 on the figure-wheels 63. The shafts 61 and setting-axle 17 are so relatively placed that the setting-pinion 29 will mesh with and drive said idlers when shifted to positions opposite thereto. Said figure-wheels (shown separately in Fig. 28) are cylinders or barrels bearing on their peripheral surfaces the numeral characters "0" to "9," consecutively. The fixed shaft 64, whereon said wheels are revolubly mounted, is so placed that said idlers 60 mesh with said gears 62.

The mechanism for releasing and shifting the master-pinion 15 will now be described.

Upon the key-rider plates $r$ are the lugs 65, which carry set-screws 66, adapted to engage the arms 67 67 on the releasing-axle $o$. Said arms are rigidly secured to said axle, and the depression of any key $s$ results in the partial rotation of the said axle. The plate or segment 68, which is also rigidly secured to said axle $o$, constitutes a cam for acting upon the roller 69, carried at the extremity of the releasing-lever 70. The rear portion of said cam-plate 68 is circular about the axle $o$ as a center. Therefore when said roller 69 is on said circular portion said roller and the lever 70 are locked in position, while said cam-plate is free to move backward and forward. By this construction there is, practically speaking, no limit to the motion of said cam-plate and releasing-arms 67, and consequently the travel of the keys $s$ is in no wise limited by said cam-plate and releasing-arms. Said lever is pivotally mounted on the arbor 71, so that the forward arm 72 of said lever will engage the bar 73, pivoted on the lug 74. The approximately upright rod 75 is rigidly secured to the said bar 73 and carries a lug or arm 76, which extends approximately horizontally from said rod 75 in a direction toward the driving gear-wheel $z$. The pin 77 is also secured to said rod. (Shown in Figs. 16, 17, 18, and 19.) The lateral or approximately-horizontal movement of the pin 77, due to the rotation of the arm 75 about its pivot, will effect a shifting of the frame 14 and master-pinion 15 mounted therein. The cam 68 is normally held by the spring 68' in such a position that the lever 72 is disengaged from the bar 73. It is only after the setting-up action of the master-pinion 15 is completed on the downstroke of the keys that said cam throws the lever 73 and shifts the said pinion 15 out of mesh with its coacting gear-wheels $z$ or 11, but at the same time shifts it onto the bar 27, thus locking it into position. The lug 78 on the driving-gear $z$ is beveled in such a manner that when said lug is in engagement with the lug 76 the rotation of said driving-gear in a rearward direction toward the initial or starting position will throw said lug 76 in a direction away from said gear $z$. This causes the master-pinion 15 to be shifted toward the gear-wheel 11. The amount of travel of the gear-wheel $z$ necessary for the action of the lug 78 on the lug 76 is equivalent in the present machine to about three teeth of said gear, and it is for the purpose of permitting the completion of such action that the teeth on said gear-wheel $z$ and also upon the gear-wheel 11 are so cut away that said wheels will not operate upon the master-pinion 15 during the shifting action of said master-wheel. The upright rod 75 is of such resiliency that the pin 76 may be temporarily withdrawn from the hub 18, so that the frame 14, carrying the master-pinion 15, may be shifted to bring either the slot 19 or the slot 20 opposite to said pin 77, depending upon whether it is required that the machine shall add or subtract. The parts are so arranged that when the pin 77 is in the slot 19 the action of the lug 78 will be to throw the said pinion into engagement with the gear-wheel 11, and when said pin 77 is in the slot 20 the action of said lug 78 will be to throw said pinion 15 into engagement with the gear-wheel $z$. It will be noted, therefore, that the action of the cam 68 upon the master-pinion 15 is opposite to the effect of the lug 78 on said master-pinion. By the action of the cam 68 said pinion will be thrown out of engagement or released from the gear-wheels 11 or $z$, while the effect of the lug 78 is to throw said pinion into engagement with the said wheels 11 or $z$. The parts are so timed that the pinion 15 will be laterally shifted into the plane of the wheel $z$ for meshing therewith just prior to the end of the return motion of said wheel $z$ and will be laterally shifted out of said plane and will be locked after the setting-up action is completed at the end of the forward stroke of said wheel.

The operation of the machine is as follows: When used in connection with a type-writing machine, the slide-bar 31 is ordinarily at such a place that the setting-pinion 29 is out of mesh with the idler-wheels 60, so that should a figure-key be struck when the type is being printed on the left portion of the recording-page said pinion will rotate without affecting the calculating mechanism; but should the pinion have been brought into mesh with some one of the wheels 60 then the rotation of said pinion would affect the mechanism, and this pinion is so brought into mesh whenever rack 36 passes pinion 35. From this it is evident that the mechanism operates for a definite column of figures and at no other place, and in that column it is affected by the highest figure first and the units last. Let it be supposed that the number "5678" is to be set up and printed, that all of the figure-wheels are at "0," and that the machine is set for addition—that is to say, pin 77 is in the slot 20, as shown in Figs. 18 and 19. When the carriage $f$ is in the proper position, the setting-pinion 29 will be opposite to and mesh with the fourth one of the idler-wheels 60, and consequently will be in gear with the fourth one of the figure-wheels 63, counting from the right end of the gang. All the ten carrying-pinions 49 to the left are now in mesh with their respective wheels 54, and all those to the right are out of mesh with wheels 54, but in mesh with the locking-bar 59, while all the wheels 60 to the right of the setting-pinion are firmly locked by the locking-bar 31ª. When the parts are in the initial or starting position, the keys $s$ will be up, and the driving-gears $z$ and 3 will occupy the position shown in Figs. 15 and 16 with the arm 8 against the stop 7 and the master-pinion 15 in alinement to mesh with the gear-wheel $z$. The figure-key bearing the character "5" is now depressed, which causes the roller $y$, mounted thereon, to throw the respective cam $q$ and cause the proper amount of rotation of the cam-axle $m$, gear-wheels $z$ and 3, and gear-wheels 10 and 11. The rotation of the wheel $z$ is imparted to the master-pinion 15 and thence to the setting-pinion 29 through the medium of the splined axle 17. This causes the character "5" to be set up on the fourth figure-wheel. Just prior to the meshing of the wheel $z$ with the pinion 15 the lug 24 on the wheel 3 operates upon the arm 23 to release the detent 21 from said pinion. After this setting-up action is completed, but before the completion of the downward stroke of the key, the set-screws 66 thereon strike an arm 67 and, acting through the releasing-axle $o$, rotates the cam 68 so as to throw the lever 72 and bar 73 downward, thereby shifting the hub 18 and frame 14 and throwing the pinion 15 sidewise out of mesh with the gear-wheel $z$. As said pinion moves away from said wheel $z$ it moves onto and is locked by the fixed bar 26. On the upward stroke of the figure-key the carriage $f$ escapes one step toward the left, and the slide-bar 31 is thereby moved one digital place to the right, consequently bringing the setting-pinion 29 to a position to set up the third figure-wheel—that is, the wheel occupying the hundreds place or column. As the figure-key approaches the end of the upward stroke it releases its hold upon the cam $q$, thus permitting the wheel $z$ and cam $q$ to be brought back to the original position by means of the spring 6. Toward the end of the backward stroke of the wheel $z$ the lug 78 operates upon the lug 76, thereby throwing the upright rod 75 and frame 14 so that the master-pinion 15 is again brought opposite to the gear-wheel $z$ preparatory to the next key-stroke. At the same time the lug 24 operates upon the lever 23 to lock pinion 15 by means of lever 25 to prevent accidental rotating while out of mesh with the wheel $z$. The same operation is now repeated with the figure-keys bearing the characters "6," "7," and "8" in order, the setting-pinion 29 being each time shifted one place to the right. Suppose the number "234" is to be added to the number "5678" already set up and printed. The carriage $f$ is moved to such a position that when the key bearing the character "2" is struck said character will be printed in the hundreds place—that is, the third from the right or units column on the recording-sheet. This placing of the carriage will so place the slide-bar 31 as to bring the setting-pinion 29 opposite the third figure-wheel, counting from the right of the set of said wheels. When the figure-key bearing the character "2" is struck, the hundreds figure-wheel will be rotated the space of two characters, and in a similar manner the tens-wheel will be rotated three spaces, and the units-wheel four spaces in setting up said number "234." Said numbers now appear on the printed sheet in the following arrangement:

5678
234 but the effect on the figure-wheels is modified by the tens-carrying mechanism. The wheel in thousands place remains unchanged, but the hundreds-wheel has been rotated two spaces and is therefore set to "8." In being rotated three additional spaces the tens-wheel, which was already at "7," passes beyond "9" and shows "0," having made one complete revolution. Since the figure-wheels are geared to the carrying-wheels 54, it follows that the respective carrying-wheel has been rotated ten spaces, thereby causing one carrying-tooth on the disks 57 and 58 to pass a carrying-pinion 49 and drive the latter one space; but, as is shown in Fig. 20, each carrying-pinion is geared also to the next carrying-wheel to the left, and so the complete revolution of the tens figure-wheel is transmitted to the hundreds figure-wheel at one-tenth of a complete revolution of the latter. In other words, the tens is carried to the hundreds wheel, and therefore said hundreds-wheel is rotated so as to show "9" instead of the "8," as it did just prior to the carrying. Therefore the number appearing on the figure-wheels before the addition of the final "4" of "234" is as follows: "5908," the units-wheel being as yet unchanged. The addition of the final "4," however, drives the units-pinion from "8" to the twelfth space, which is two beyond the zero-point, and the units-wheel shows "2;" but in having completed the revolution the units-wheel has caused the tens-wheel to be rotated one space from "0" to "1" through the agency of the carrying mechanism, as above described, and the total appears thus: "5912." Attention is directed to the fact that all the figure-wheels to the left of the one being temporarily acted upon by the setting-pinion 29 is subject to the operation of the tens-carrying mechanism. In other words, the figure-wheels whose place values are higher than the place value of the figure-wheel temporarily in mesh with the setting-pinion are in gear, so that the tens may be carried as is common in counting mechanism. On account of the construction of the tens-carrying wheels and tens-carrying pinions the parts of the present mechanism to the left of the setting-pinion constitute simply a locked counting mechanism, whereas those to the right of said pinion constitute merely a locked series of loose disks.

The process of subtraction will now be described. As the figure-wheels 63 and the parts of the carrying mechanism are so constructed as to be reversible it is only necessary that after the minuend has been set up on the figure-wheels the effect of depressing a figure-key s will be to rotate the figure-wheels backward in a direction opposite to the direction required in adding. This reverse action of the figure-keys is attained by shifting the master-pinion 15 so that it will be driven by the gear-wheel 11 instead of the gear-wheel z when the key is being depressed. This will be evident by referring to Figs. 16 to 19, for the gears 10 and 11 are employed merely as idle gears to reverse the direction of rotation of the wheels z and 3. Therefore when the machine is to subtract the pin 77 on the rod 75 is set so as to work in the slot 19 on the hub 18. This causes the master-pinion to mesh with the wheel 11 during the depression of the figure-keys and to be shifted to the sides of said gear, as shown in Fig. 17, during the upstroke of said keys. In order that the tens-carrying pinions 49 may be moved into mesh with the tens-carrying wheels *seriatim*, commencing with the pinion corresponding to the highest place value in the number to be set up, the frames 47 are swung *seriatim* by the slide-bar 31. This operation is illustrated diagrammatically in Figs. 29 and 30, wherein 49ª represents the pinions and 54ª the carrying-wheels. The same result may, however, be accomplished in different ways, two alternate methods being shown in Figs. 31 to 34.

In Figs. 31 and 32, 49ᵇ represents carrying-pinions, which are here mounted so as to be shiftable on the fixed bar 79. Each of said pinions may be shifted into mesh with its respective carrying-wheel 54ᵇ and would be so shifted *seriatim*. In this method each pinion will have only a slight travel, merely sufficient to accomplish the meshing and unmeshing.

Figs. 33 and 34 show a method in which the pinions 49ᶜ are independently rotatable upon the fixed shaft 79, but are shiftable on said shaft as a single gang. Said pinions approach from the left and progress toward the right.

The method of returning all the figure-wheels to zero is to set up the machine to subtract and then strike the figure-keys which represent the number set up on the figure-wheels—that is to say, the figure-wheels may all be set to zero by subtracting the number shown thereon.

One of the features of my machine lies in the opportunity it affords for checking errors in recording footings or remainders. For example, suppose it is desired to record on the printed page a given number and at the same time set all the figure-wheels to zero. Now if the operator strikes the wrong figure-keys the figure-wheels will not show zero, but will show some number, and this will represent the amount of error existing between the number which the operator did print and the given number which should have been printed. Consequently the number appearing on the figure-wheels after said wheels were expected to come to zero represents the amount of error in recording, and since the amount of error is known correction may easily be made.

What I claim as new, and desire to secure by Letters Patent, is—

1. In combination, a cam-axle, slotted cams on said axle and key connections for operating the cams, the slots in said cams extending at different angles from said axle, and being of a length greater than the travel of the key connections, thereby avoiding the limiting of the travel of said key connections.

2. In combination, a cam-axle, reciprocatory key parts, and cams secured to said axle, said cams having slots for receiving said reciprocatory key parts and said slots lying substantially tangent to the path of said key parts at the end of the positive stroke thereof, thereby preventing the rotation of said cams.

3. In a calculating-machine the combination of cams for setting up the digits-keys, and key-riders comprising plates movable toward and from each other at one portion of their length, means for forcing said plates against the key-shanks to retain said riders on said keys, and means on said keys for engaging and operating said cams.

4. In a calculating-machine, the combination of cams for setting up the digits, a key and a key-rider comprising plates for engaging the sides of the key-shank, a rider-block for engaging the edge of said key-shank, a wedging device for engaging the remaining edge of said key-shank and for forcing the rider-plates toward the sides of said key-shanks and means on said rider for engaging one of said cams.

5. In a calculating-machine, the combination of cams, keys, key-rider plates adapted to engage the sides of the key-shanks, rider-blocks adapted to engage one edge of said key-shanks, a wedge-block having a double bevel for engaging said rider-plates, a set-screw in said wedge-block engaging the remaining edge of said key-shank, and means upon said rider-plates for operating said cams.

6. In a calculating-machine, the combination of a master-pinion for setting up the number, a driving gear-wheel for actuating said pinion, means for operating said gear-wheel, and means for moving said pinion into and out of mesh with said driving-wheel, said driving-wheel therefore acting upon said master-pinion in one direction only.

7. In a calculating-machine, the combination of a master-pinion for setting up the number, a driving gear-wheel for actuating said master-pinion, and means operated by said keys for shifting said master-pinion into and out of mesh with said driving gear-wheel for driving said master-pinion in one direction only.

8. In a calculating-machine, the combination of a master-pinion for setting up the number, a driving gear-wheel for actuating said pinion, figure-keys, connections between said keys and said driving gear-wheel, and a releasing mechanism operated by said keys for throwing said pinion into and out of mesh with said driving gear-wheel.

9. In a calculating-machine, the combination of a master-pinion for setting up the number, a driving gear-wheel for rotating said pinion in one direction, a second drive-wheel for rotating said pinion in the opposite direction, key connections for actuating said driving-wheels and a shifting device for said pinion whereby the latter may be brought into gear with the chosen one of said driving gear-wheels.

10. In a calculating-machine, the combination of a master-pinion for setting up the number, a driving gear-wheel for actuating said pinion in one direction during the process of addition, a second driving gear-wheel for actuating said pinion in the opposite direction during the process of subtraction, a setting device for positioning said pinion and thereby predetermining which of said two driving-gears shall be operative upon said master-pinion, and keys operating upon said driving gear-wheels for driving the same.

11. In a calculating-machine, the combination of a master-pinion for setting up the number, a reciprocating driving gear-wheel for rotating said pinion when said driving-wheel is rotating in one direction and means for disconnecting said pinion and said driving-wheel when the latter is rotating in the opposite direction.

12. In a calculating-machine, the combination of a master-pinion for setting up the number, a pair of driving gear-wheels one of said wheels being adapted to gear directly with said pinion and the second of said wheels being adapted to gear indirectly with said pinion, said wheels being thereby adapted to drive said pinion in opposite directions, and a shifting device for said pinion, said device positioning said pinion to gear with either one singly or neither of said driving-wheels for the purpose described.

13. In combination, a pinion, a gear-wheel for driving said pinion, a lever connected to said pinion for shifting the same into and out of mesh with said driving-wheel, and key-operated means for operating said lever.

14. In combination, a pinion, a gear-wheel for driving said pinion, a frame for shifting said pinion into and out of mesh with said driving-wheels, a lever connected to said frame for shifting the same, means for operating said lever.

15. In a calculating-machine, the combination of a pinion for setting up the number, a gear-wheel for driving said pinion, a frame for shifting said pinion into and out of gear with said driving-wheel, a lever connected to said frame, cam-operated means for shifting said frame in one direction and other means for shifting said frame in the opposite direction.

16. In a calculating-machine, the combination of a pinion for setting up the number, a gear-wheel for driving said pinion, a lever connected to said pinion for shifting the same into and out of gear with said driving-wheel, a beveled lug on said driving-wheel acting upon said lever to throw the same in one direction and other means for throwing said lever in the opposite direction.

17. In a calculating-machine, the combination of a pinion for setting up the number, a gear-wheel for driving said pinion, a lever connected to said pinion for shifting the same into and out of gear with said driving-wheel a cam acting upon said lever for throwing the same in one direction and other means for throwing said lever in the opposite direction.

18. In a calculating-machine the combination of a pinion for setting up the number, a gear-wheel for driving said pinion, a lever connected to said pinion for throwing the same into and out of gear with said driving-wheel, a cam for throwing said lever in one direction and a cam or beveled lug on said driving-wheel for throwing said lever in the opposite direction.

19. In a calculating-machine, the combination of a pinion for setting up the number, a gear-wheel for driving said pinion, a lever connected to said pinion for throwing the same into and out of mesh with said driving-wheel, means upon said driving-wheel for throwing said lever in one direction, a second cam for throwing said lever in the opposite direction and a key-operated axle for actuating said second cam.

20. In a calculating-machine, the combination of a pinion for setting up the number, a gear-wheel for driving said pinion, a lever connected to said pinion for throwing the same into and out of mesh with said driving-wheel, means upon said driving-wheel for throwing said lever in one direction, a second cam for throwing said lever in the opposite direction, an axle carrying said cam, arms upon said axle, and means for engaging and actuating said arms.

21. In a calculating-machine, the combination of a pinion for setting up the number, a gear-wheel for driving said pinion, a lever connected to said pinion for throwing the same into and out of mesh with said driving-wheel, means for throwing said lever in one direction, an axle connected to said lever for throwing the same in the opposite direction, arms upon said axle, and keys for engaging said arms.

22. In a calculating-machine, the combination of a pinion for setting up the number, a gear-wheel for driving said pinion, a lever connected to said pinion for throwing the same into and out of gear with said driving-wheel, means for throwing said lever in one direction, a cam for throwing said lever in the opposite direction, a cam-axle bearing said cam, arms upon said axle, figure-keys for operating said arms, and adjustable connections between said keys and said arms.

23. In a calculating-machine, the combination of a figure-key, a driving gear-wheel operated by said keys, a pinion for setting up the number, a shifting device for throwing said pinion into gear with said driving-wheel during one stroke of the key and out of gear during the reciprocatory stroke of said key, said shifting device comprising a lever connected to said pinion for shifting the same, an axle connected to said lever for throwing said lever in one direction, arms upon said axle, key-riders upon said keys and acting upon said arms and other means for throwing said lever in the opposite direction.

24. In a calculating-machine the combination of gear-wheels whereby the number is set up, a driving-wheel whereby said gear-wheels are actuated, a cam mechanism for actuating said driving-wheel, said driving-wheel being in gear with said setting-up mechanism at one part of its operation and out of gear therewith at another part of its operation, and means for connecting and disconnecting said drive-wheel to and from the setting-up mechanism.

25. In a calculating-machine the combination of a master-pinion for setting up the number, a driving gear-wheel for actuating said pinion, means for laterally shifting said pinion into and out of mesh with said driving-wheel, said driving-wheel having some of the teeth thereof removed, and therefore being intermittently inoperative upon said pinion, a fixed locking-bar for locking said pinion when the latter is shifted laterally from said driving-wheel; and a movable locking-arm operated by said driving-wheel for locking said pinion when said driving-wheel is opposite to but inoperative upon said pinion.

26. In a calculating-machine the combination of a master-pinion for setting up the number, a driving gear-wheel for actuating said pinion, figure-keys, connections between said keys and said drive-wheel, and a releasing mechanism operated by said keys for throwing said pinion out of mesh with said driving gear-wheel during the latter part of the positive stroke thereof.

27. In a calculating-machine a master-pinion for setting up the number and a reciprocatory driving-gear for actuating said pinion, means for throwing said master-pinion out of connection with said driving-gear and other means operated by said driving-gear near the end of the return stroke thereof for throwing said master-pinion into connection with said driving-gear.

28. In a calculating-machine, the combination of a master-pinion for setting up the number, a driving-gear for rotating said pinion in one direction, a second driving-gear for rotating said pinion in the opposite direction, key connections for actuating said driving-gears, and means for bringing said pinion into geared connection with the chosen one of said driving-gears.

29. In a calculating-machine, the combination of a master-pinion for setting up the number, a driving gear-wheel for positively engaging said master-pinion to control the rotation thereof, in both directions during the action of setting up, and means for disconnecting said pinion from said driving-gear when the latter is returning to its original position.

30. In a calculating-machine the combination of a master-pinion for setting up the number, a reciprocatory driving-wheel for positively engaging said master-pinion to control the rotation thereof in both directions, and means acting after the completion of the forward or positive stroke of said driving-wheel for disconnecting said pinion and driving-wheel, thereby returning the master-pinion with the driving-wheel to their original positions in case the driving-wheel does not fully complete its stroke.

31. In a calculating-machine, a reversing mechanism, comprising three spur gear-wheels having fixed parallel axes, two of said wheels being always in mesh and the third of said wheels being laterally shiftable to mesh with the selected one of said first two wheels, said first two wheels each having a portion wherefrom the teeth are removed to thereby permit the free rotation of said third gear-wheel; and means for shifting said third wheel into mesh with either one or neither one of said driving-wheels.

32. In a calculating-machine, the combination of figure-keys, a master-pinion for setting up the number, a driving gear-wheel for actuating said pinion, key-operated means for disconnecting said master-pinion from said driving-wheel, other means operated by said driving gear-wheel for connecting said master-pinion to said driving-wheel during the latter part of the motion thereof.

33. In a calculating-machine, the combination of keys, a master-pinion for setting up the number, a driving gear-wheel for actuating said master-pinion, key-operated means for disconnecting said master-pinion from said driving gear-wheel and other means for connecting said master-pinion to said driving-gear at the end of the motion of the latter.

34. In a calculating-machine the combination of figure-keys, a driving-gear, a master-pinion for setting up the number, key-operated means for moving and stopping said driving-gear during the first part of the key-stroke, other key-operated means for disconnecting said master-pinion from said driving-gear during the latter part of the key-stroke and other means for again connecting said master-pinion to said driving-gear at the end of the motion of the latter.

35. In combination, a pair of circular disks, rotating as a single piece and having a portion of their peripheries removed, the portions remaining corresponding approximately to the point-circle of a gear-wheel said point-circle portions on said disks overlapping each other the width of one gear-tooth at at least two points to form carrying-teeth; a pair of mutilated gear-pinions rotating as a single piece and so mutilated that a tooth on one of said pinions comes adjacent to a space on the other of said pinions, said disks and pinions gearing one with the other; a complete toothed pinion rotating as a single piece with said mutilated pinions, a complete gear-wheel gearing with said pinion, and means for throwing one at a time said pinions into and out of mesh with said disks and complete gear-wheel.

36. In combination, a pair of circular disks, rotating as a single piece and having a portion of their peripheries removed, the portions remaining corresponding approximately to the point-circle of a gear-wheel, said point-circle portions on said disks overlapping each other the width of one gear-tooth at at least two points to form carrying-teeth; a pair of mutilated gear-pinions rotating as a single piece and so mutilated that a tooth on one of said pinions comes adjacent to a space on the other of said pinions, said disks and pinions gearing one with the other; a complete toothed pinion rotating as a single piece with said mutilated pinions, a complete gear-wheel gearing with said pinions, means for throwing said pinions into and out of mesh with said disks and complete gear-wheel, and a locking-bar for engaging said pinions when the same are out of mesh with their coacting parts.

37. In combination, a pair of disks, rotating as a single piece and having a portion of their peripheries removed, the portions remaining corresponding approximately to the point-circle of a gear-wheel, said point-circle portions on said disks overlapping each other the width of one gear-tooth at at least two points to form carrying-teeth; a pair of mutilated gear-pinions rotating as a single piece and so mutilated that a tooth on one of said pinions comes adjacent to a space on the other of said pinions, said disks and pinions gearing one with the other; a complete toothed pinion rotating as a single piece with said mutilated pinions, a complete gear-wheel gearing with said pinion, frames for moving said pinions into and out of gear with their coacting parts and means for moving said frames *seriatim*.

38. In a calculating-machine the combination of a counting mechanism comprising figure-wheels and a carrying mechanism operative upon said figure-wheels, parts of said carrying mechanism being movable into and out of connection with said figure-wheels to render said carrying mechanism operative or non-operative; a shiftable setting-pinion for operating said figure-wheels to set up the number, and means for shifting said setting-pinion and simultaneously throwing into connections the parts of said carrying mechanism to the left of said setting-pinion thereby rendering the parts of said calculating mechanism to the left of the setting-pinion operative as a counting mechanism, while leaving the parts to the right of said setting-pinion inactive.

39. In a calculating-machine, the combination of a counting mechanism comprising figure-wheels and tens-carrying mechanism operative upon said figure-wheels, parts of said carrying mechanism being movable into and out of connection with said figure-wheels to render said carrying mechanism operative or non-operative; a setting-pinion for operating said figure-wheels to set up the number and a slide-bar for shifting said pinion laterally to actuate said figure-wheels *seriatim* said slide-bar also simultaneously throwing into connection the parts of said carrying mechanism to the left of said setting-pinion, thereby, rendering the parts of said calculating-machine to the left of the setting-pinion operative as a counting mechanism while leaving the parts to the right of said setting-pinion inactive.

40. In a calculating-machine, a shiftable setting-pinion for setting up the number, a carriage, a gear-wheel, connections between said gear-wheel and said pinion for shifting the same, and a rack adjustably connected to said carriage for rotating said gear-wheel in both directions, thereby shifting said setting-pinion in both directions.

41. In a calculating-machine, the combination of a set of figure-wheels, carrying mechanism capable of being thrown into and out of operative connection with said figure-wheels, a setting-pinion gearing with said figure-wheels *seriatim*, a slide-bar for shifting said pinion and simultaneously throwing said carrying mechanism to the left of said pinion into operative connection with said figure-wheels, and means on said slide-bar for locking the figure-wheels to the right of said pinion.

42. In a calculating-machine, the combination of carrying-wheels, carrying-pinions, movable frames carrying said pinions for throwing the same into and out of gear with said carrying-wheels, and means for operating said frames *seriatim*.

43. In a calculating-machine, the combination of carrying-wheels, carrying-pinions movable frames carrying said pinions for throwing the same into and out of gear with said carrying-wheels, a slide-bar and a cam in said slide-bar for operating said frames.

44. In a calculating-machine, the combination of carrying-wheels, carrying-pinions, pivoted frames carrying said pinions for swinging the same into and out of gear with said carrying-wheels; pins on said frames for swinging the same; a slide-bar, and a cam-like slot in said bar for receiving said pins to thereby swing said frames.

45. In a calculating-machine the combination of carrying-wheels, carrying-pinions, gearing therewith, swinging frames carrying said pinions for throwing the same into and out of gear with said carrying-wheels, pins on said frames, a slide-bar and a slot in said bar for receiving said pins, said slot being in two connected portions extending lengthwise of said bar, and located at the extremities of the throw of said pins for locking said frames at the extremities of their paths of oscillation.

46. In a calculating-machine, the combination of figure-wheels, a laterally-shiftable setting-pinion gearing with said figure-wheels *seriatim*, a carriage, and connections between said carriage and said pinion whereby the motion of said carriage is imparted to said pinion for shifting the same.

47. In a calculating-machine the combination of a tens-carrying mechanism consisting of gear-wheels intermittently interlocking and meshing; a gang of figure-wheels in gear with said tens-carrying mechanism and a laterally-shiftable setting-pinion gearing with said figure-wheels *seriatim*, the figure-wheels and tens-carrying mechanism of higher digital place value than the figure-wheel temporarily in gear with said pinion being a counting mechanism.

48. In a calculating-machine the combination of a tens-carrying mechanism consisting of gear-wheels intermittently interlocking and meshing; a gang of figure-wheels in gear with said tens-carrying mechanism; a laterally-shifting setting-pinion, gearing with said figure-wheels *seriatim*, the figure-wheels and tens-carrying mechanism of higher digital place value than the figure-wheel temporarily in gear with said pinion, constituting a locked counting mechanism; a movable carriage for the recording-sheet; and connections between said carriage and said setting-wheel for shifting said pinion.

49. In a calculating-machine, the combination of a set of figure-wheels, carrying mechanism operative upon said wheels, a laterally-shiftable setting-pinion for setting up the number on said wheels, a slide-bar for shifting said setting-pinion, a toothed rack on said slide-bar for shifting the same, a movable carriage for carrying the recording-sheet, and a gear-wheel operated by said carriage and meshing with said rack for shifting said slide-bar in both directions.

50. In a calculating-machine, the combination of a set of figure-wheels, carrying mechanism operative upon said wheels, a laterally-shiftable setting-pinion for setting up the number on said wheels, a slide-bar for shifting said setting-pinion, a toothed rack on said slide-bar for shifting the same, a movable carriage for carrying the recording-sheet, a toothed rack on said carriage and gear-wheels rigidly secured to a common integral shaft or spindle, one of said wheels meshing with the toothed rack on said carriage and the other of said wheels meshing with the toothed rack on said slide-bar to thereby shift said setting-pinion in both directions.

51. In a calculating-machine, the combination of a set of figure-wheels, carrying mechanism operative upon said wheels, a laterally-shiftable setting-pinion for setting up the number on said wheels, a slide-bar for shifting said setting-pinion, a toothed rack on said slide-bar for shifting the same, a movable carriage for carrying the recording-sheet, a toothed rack on said carriage and gear-wheels rigidly secured to a common integral shaft or spindle, one of said wheels meshing with the toothed rack on said carriage, the other of said wheels meshing with the toothed rack on said slide-bar to thereby shift said setting-pinion in both directions.

52. In a calculating-machine, the combination of a set of figure-wheels, carrying mechanism operative upon said wheels, a laterally-shiftable setting-pinion for setting up the number on said wheels, a slide-bar for shifting said setting-pinion, a toothed rack on said slide-bar for shifting the same, a movable carriage for carrying the recording-sheet, a toothed rack on said carriage and gear-wheels rigidly secured to a common integral shaft, or spindle, one of said wheels meshing with the toothed rack on said carriage, the other of said wheels meshing with the toothed rack on said slide-bar, and means for adjusting the position of the toothed rack on said carriage to thereby adjust the position of the calculating mechanism relatively to the paper upon said carriage.

53. In a calculating-machine, the combination of a master-pinion for setting up the number, gears for driving said master-pinion, figure-keys, a releasing-axle connected to said master-pinion for throwing the same into and out of connection with said driving-gears, arms on said axle for rotating the same, and means on said figure-keys for engaging said arms.

54. In a calculating-machine, the combination of a master-pinion for setting up the number, gears for driving said master-pinion, figure-keys, a releasing-axle connected to said master-pinion for throwing the same into and out of connection with said driving-gears, arms on said axle for rotating the same, key-riders on said keys, and adjustable connection on said key-riders for engaging said arms.

55. In a calculating-machine, the combination, a master-pinion for setting up the number, gears for driving said master-pinion, figure-keys a releasing-axle connected to said master-pinion for throwing the same into and out of connection with said driving-gears, arms on said axle for rotating the same, key-riders on said keys, lugs on said key-riders, and set-screws adjustable in said lugs for engaging said arms.

56. In combination, a key shank and rider, the rider being composed of a rider-block in one edge of the key-shank, two plates fastened to the rider-block for engaging the sides of the key-shank, a double-beveled wedge-block for forcing said side plates together against the key-shank, and means bearing against the other edge of said key-shank for forcing said wedge-block away from the edge of the key-shank, said key-shank being thereby engaged simultaneously on all sides.

57. In a calculating-machine, the combination of a set of figure-wheels, carrying mechanism operative thereon, a setting-pinion gearing with said figure-wheels *seriatim*, a slide-bar for shifting said pinion, a set of beveled notches in said slide-bar and an arm pivoted to a fixed part of the machine and tending to spring into said notches to thereby adjust said slide-bar to bring the said pinion in proper position for gearing with said figure-wheels.

58. In a calculating-machine the combination of key-levers, driving-gear, a master-pinion driven by said driving-gear for setting up the number, said pinion being movable into and out of mesh with said driving-gear, a lever for moving said pinion out of mesh with said driving-gear, and a key-operated cam having a circular portion, said cam operating said lever and said circular portion locking said lever, and means for moving said pinion into connection with said driving-gear.

HYMAN ELI GOLDBERG.

Witnesses:
S. WOLF,
ARTHUR M. COX.